United States Patent
Katayama et al.

(10) Patent No.: US 8,379,708 B2
(45) Date of Patent: Feb. 19, 2013

(54) METHOD AND CIRCUIT FOR DIGITALLY FILTERING A SIGNAL

(75) Inventors: Yasunao Katayama, Yamato (JP); Daiju Nakano, Yamato (JP); Kohji Takano, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/924,535

(22) Filed: Sep. 29, 2010

(65) Prior Publication Data
US 2011/0075776 A1 Mar. 31, 2011

(30) Foreign Application Priority Data
Sep. 29, 2009 (JP) .................. 2009-224564

(51) Int. Cl.
*H03H 7/40* (2006.01)
(52) U.S. Cl. ........ 375/229; 375/350; 375/355; 708/290; 708/300; 708/301
(58) Field of Classification Search .................. 375/229, 375/230, 346, 348, 350, 355; 708/290, 300, 708/301, 303, 313, 322
See application file for complete search history.

(56) References Cited

U.S. PATENT DOCUMENTS

| 6,307,879 | B1 | 10/2001 | Moriyama |
| 6,668,013 | B1 | 12/2003 | Okuno |
| 7,292,665 | B2 * | 11/2007 | Eglit ............................ 375/355 |
| 2004/0066864 | A1 * | 4/2004 | Cranford et al. ............. 375/343 |
| 2008/0288094 | A1 * | 11/2008 | Fukushima ..................... 700/94 |

FOREIGN PATENT DOCUMENTS

GB 2351633 3/2001

* cited by examiner

*Primary Examiner* — Dac Ha
(74) *Attorney, Agent, or Firm* — Gail H. Zarick; Anne Vachon Dougherty (57) ABSTRACT

A method and circuit that gives a sequence pattern that represents directions of positive and negative transitions of the phase that continue over a predetermined number from a certain reference symbol to an adjoining next reference symbol; finds (heuristically) one or more interpolate symbols that meet conditions (such as standards for power spectra) of a predetermined frequency spectrum, i.e., band, and a predetermined (range of) amplitude with reference to the given sequence pattern; and stores the found sequence pattern and a phase value and an amplitude value corresponding to the found one or more interpolate symbols in a memory as a lookup table against the prepared memory area.

8 Claims, 10 Drawing Sheets

| | | | | | |
|---|---|---|---|---|---|
| + | + | + | + | + | Pattern-0 |
| + | + | + | + | - | Pattern-4-4 |
| + | + | + | - | + | Pattern-3-1 |
| + | + | + | - | - | Pattern-3-3 |
| + | + | - | + | + | Pattern-2-1 |
| + | + | - | + | - | Pattern-2-1-1-1 |
| + | + | - | - | + | Pattern-2-2 |
| + | + | - | - | - | Pattern-3-3 |
| + | - | + | + | + | Pattern-3-1 |
| + | - | + | + | - | Pattern-2-1 |
| + | - | + | - | + | Pattern-1-1 |
| + | - | + | - | - | Pattern-2-1-1-1 |
| + | - | - | + | + | Pattern-2-2 |
| + | - | - | + | - | Pattern-2-1 |
| + | - | - | - | + | Pattern-3-3 |
| + | - | - | - | - | Pattern-4-4 |

| | | | | | |
|---|---|---|---|---|---|
| - | + | + | + | + | Pattern-4-4 |
| - | + | + | + | - | Pattern-3-3 |
| - | + | + | - | + | Pattern-2-1 |
| - | + | + | - | - | Pattern-2-2 |
| - | + | - | + | + | Pattern-2-1-1-1 |
| - | + | - | + | - | Pattern-1-1 |
| - | + | - | - | + | Pattern-2-1 |
| - | + | - | - | - | Pattern-3-1 |
| - | - | + | + | + | Pattern-3-3 |
| - | - | + | + | - | Pattern-2-2 |
| - | - | + | - | + | Pattern-2-1-1-1 |
| - | - | + | - | - | Pattern-2-1 |
| - | - | - | + | + | Pattern-3-3 |
| - | - | - | + | - | Pattern-3-1 |
| - | - | - | - | + | Pattern-4-4 |
| - | - | - | - | - | Pattern-0 |

4×2⁵=128 entries

| Input symbols I(t) | | | | | | DAC Output (3x up-sample) o(3t) | | |
|---|---|---|---|---|---|---|---|---|
| In(t-2) | In(t-1) | In(t) | In(t+1) | In(t+2) | In(t+3) | out(t) | out(t+1/3) | out(t+2/3) |
| + | + | + | + | + | 00 | In(t) | n-bit(re)+n-bit(im) | n-bit(re)+n-bit(im) |
| + | + | + | + | − | 00 | In(t) | n-bit(re)+n-bit(im) | n-bit(re)+n-bit(im) |
| + | + | + | − | + | 00 | In(t) | n-bit(re)+n-bit(im) | n-bit(re)+n-bit(im) |
| ⋮ | ⋮ | ⋮ | ⋮ | ⋮ | ⋮ | ⋮ | ⋮ | ⋮ |
| − | − | − | − | − | 00 | In(t) | n-bit(re)+n-bit(im) | n-bit(re)+n-bit(im) |
| + | + | + | + | + | 01 | In(t) | n-bit(re)+n-bit(im) | n-bit(re)+n-bit(im) |
| ⋮ | ⋮ | ⋮ | ⋮ | ⋮ | ⋮ | ⋮ | ⋮ | ⋮ |
| − | − | − | − | − | 11 | In(t) | n-bit(re)+n-bit(im) | n-bit(re)+n-bit(im) |

Interpolated points

|  | Registers | Combinatorial Logic* |
|---|---|---|
| FIR 5-bit output, 5-bit coefficient | 10 | 105 |
| FIR 5-bit output, 6-bit coefficient | 10 | 113 |
| FIR 5-bit output, 7-bit coefficient | 10 | 148 |
| FIR 5-bit output, 8-bit coefficient | 10 | 157 |
| FIR 5-bit output, 9-bit coefficient | 10 | 171 |

|  | Registers | Combinatorial Logic* |
|---|---|---|
| LUT 5-bit output | 6 | 30 |

Logic synthesis/PR : Xilinx ISE XST
Device target : XC5VLX20T-1
Constraint : Clk = 125MHz, extract ROM, no register duplication (*)number of 6-input 2-output look-up-table in Virtex5 CLB

METHOD AND CIRCUIT FOR DIGITALLY FILTERING A SIGNAL

FIELD OF THE INVENTION

The present invention relates to obtaining a spectrum that meets standard requirements or the like in a system of transmitting data over a high carrier frequency by digitally filtering a signal. More specifically, the invention enables desired pulse shaping by using high-speed and small-sized circuitry.

BACKGROUND OF THE INVENTION

In a system of transmitting data over a carrier, the frequency may be as high as 60 GHz frequency band (millimeter wave) and the baseband signal may also be transmitted over a high operating frequency. In radio communication, the frequency band available for the communication is defined by standards or the like; therefore, the frequency spectrum for the transmission should be within the defined range. Behind the scene circumstances of the definition include that a band is narrowed by suppressing the undesired side band for the baseband signal in order to effectively utilize the radio wave resources.

The available frequency band width is subdivided according to the use and purpose. For example, IEEE 802.15.3c defines a limit on the power spectral density for a transmitter to prevent electrical interference with other channels. Therefore, it is required to obtain a desired transmit signal by filtering and pulse shaping the transmit signal to transform it to meet the defined frequency spectrum.

Figure 1:
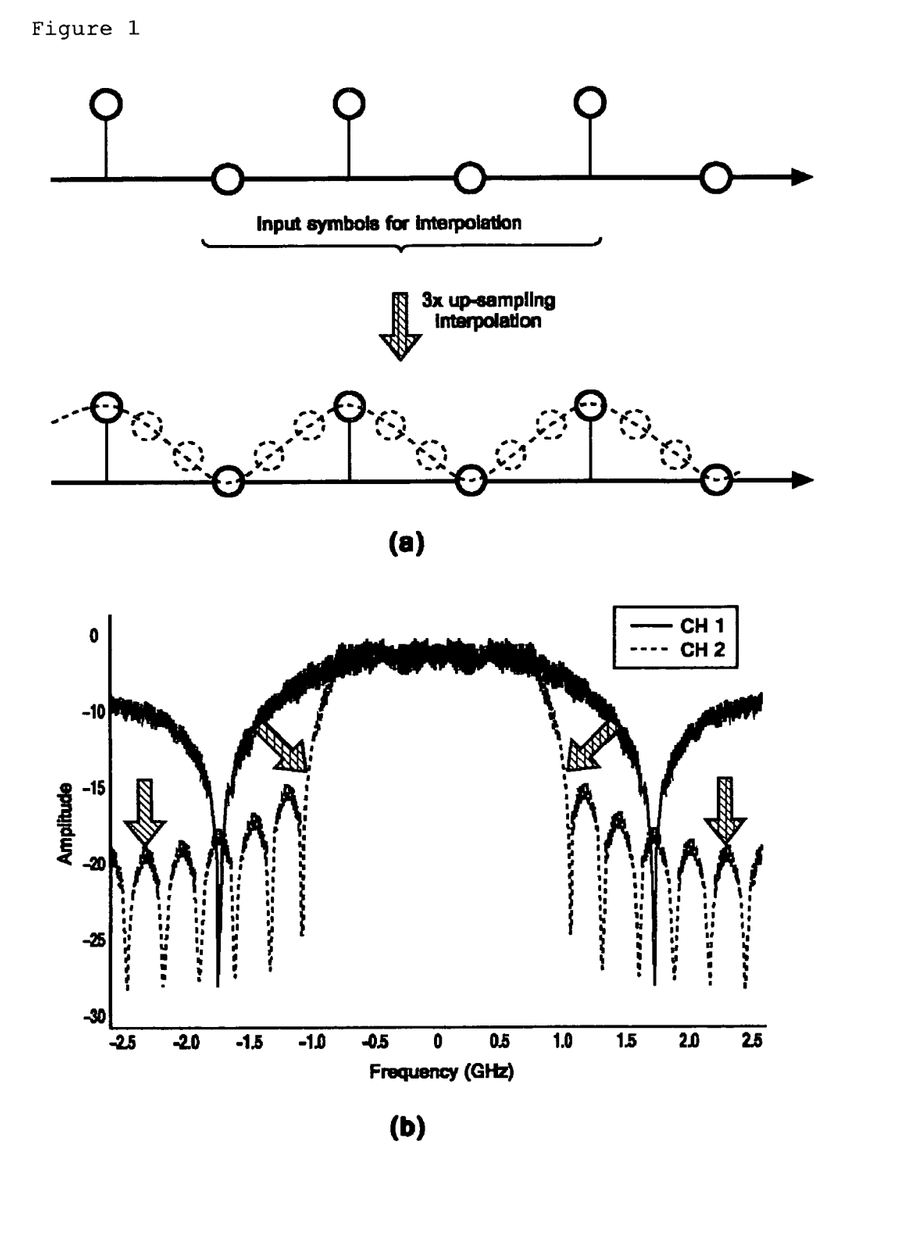
FIGS. 1(a) and 1(b) are schematic diagrams showing a signal being pulse shaped.

FIG. 1 is a schematic diagram showing a signal being pulse shaped. FIG. 1 (a) shows pulse shaping on the time axis; and FIG. 1 (b) shows the frequency spectrum being transformed to desired components by the pulse shaping. It is obtained by sampling the signal at a certain frequency (i.e., at regular intervals). By taking an example of transferring the pulse shape by a single carrier at the rate of 1.728 Gbps, the Digital Analog Converter (DAC) is driven at more detailed threefold frequency and the output waveform is sent. Consequently, the pulse shape forms a very high operating frequency that exceeds 5G samples per second, which is difficult to implement.

Generally, the filter circuit for pulse shaping a signal is a raised cosine Finite Impulse Response (FIR) filter, which can realize the filtering that meets the Nyquist condition and does not produce any interference between signals. This is only available for the ideal case where sufficiently accurate operations can be provided. As a high operating frequency is required for real implementation of the circuitry, the effective number of bits for the DAC is limited; therefore, a highly accurate value cannot be used.

Figure 2:
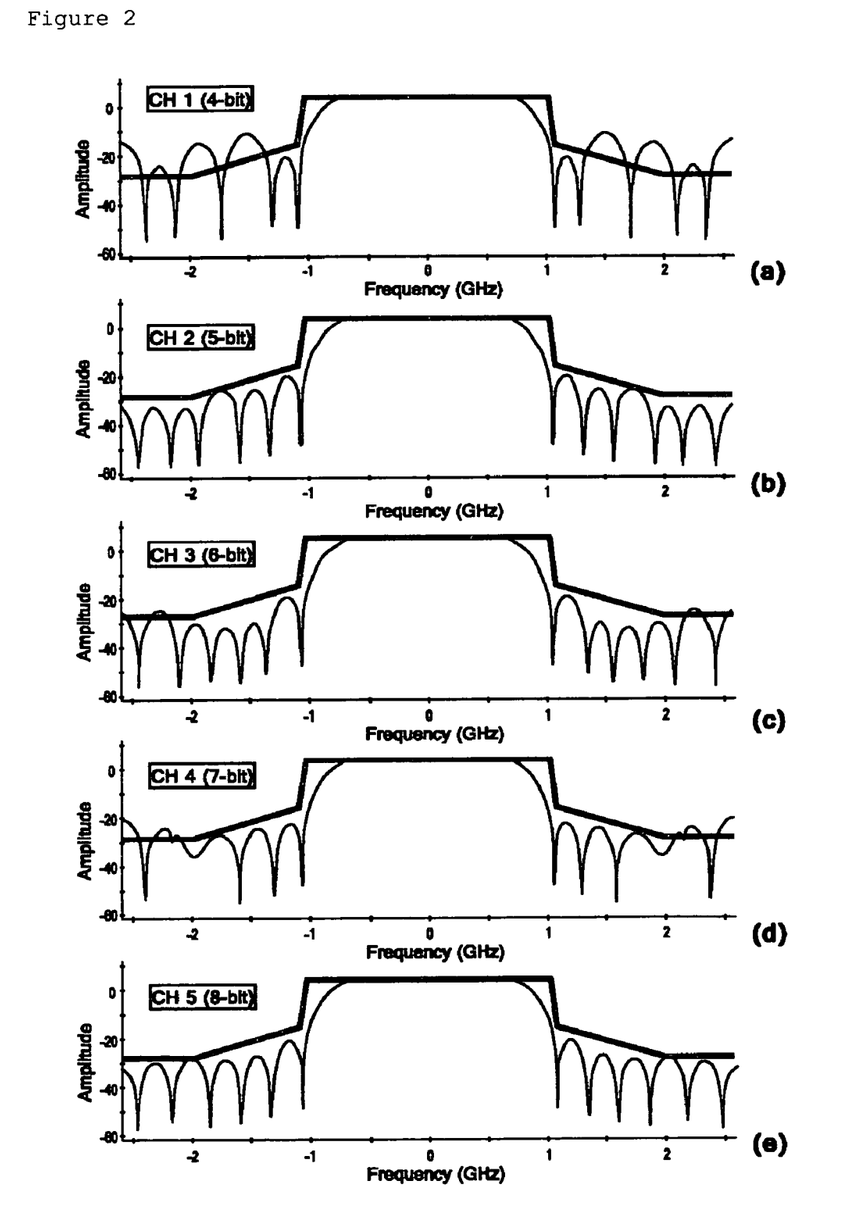
FIGS. 2(a) through 2(e) are diagrams showing a frequency spectrum where the DAC accuracy is from 4 bit to 8 bit.

FIGS. 2(a) through 2(e) are diagrams showing a frequency spectrum where the DAC accuracy is from 4 bits through 8 bits. As illustrated, the abscissa represents frequency and the ordinate represents power spectral density. In the figure, the straight line shows the power spectrum defined by the standards, which means that a frequency component with the spectral density exceeding the line should not exist. It is apparent from FIGS. 2(a) through 2(d) that the raised cosine filter using a low accurate DAC from 4 bits to 7 bits does not meet the defined frequency spectrum. As shown in FIG. 2(e), the filter narrowly meets the standard by using the 8-bit DAC, but it is not preferable because the 8-bit DAC is extremely expensive. Here, a pulse shaping method that operates by meeting the standard even with the less than 8-bit DAC by using an implementation other than that of the conventional raised cosine FIR filter, and an implementation for the method are desired. For a digital filter, its accuracy depends on the number of bits in the DAC as mentioned above, but on the other hand, a high-speed operation is required for realizing the wide band.

An analog filter can be considered as a substitute, but its feature might change over the years. In addition, there is variation in the feature of the analog filter at the manufacturing plant, and the feature largely changes as the operating environment (temperature, power supply voltage) changes; accordingly, it is difficult to realize and maintain the accurate Nyquist, which leads a technical problem of lowering the reproducibility.

SUMMARY OF THE INVENTION

Digital filtering (pulse shaping) that can provide a high-speed operation with a small amount of circuitry and that realizes accuracy higher than conventional techniques is desired.

A method for digitally filtering a signal according to the present invention includes:

sampling a signal and representing the signal discretely by a plurality of reference symbols consisting of symbols with different phases and amplitudes;

sampling more finely between said plurality of discretely represented reference symbols to prepare a plurality of interpolate symbols consisting of symbols with different phases and amplitudes that are considered discrete representations;

giving a sequence pattern that represents directions of positive and negative of the phase in transitions that continue over a predetermined number from a certain reference symbol to an adjoining reference symbol;

finding one or more interpolate symbols that meet conditions of a predetermined frequency spectrum and a predetermined amplitude with reference to the given sequence pattern;

storing the found sequence pattern and a phase value and an amplitude value corresponding to the found one or more interpolate symbols as a lookup table in a memory;

receiving a real signal as an input and converting the signal into said sequence pattern with reference to the reference symbols;

looking up whether a sequence pattern that matches the sequence patterns stored in said memory is among the converted sequence patterns; and if a matched sequence pattern is detected by the looking up step, reading out the phase value and the amplitude value corresponding to one or more interpolate symbols that constitute the sequence pattern from said memory, and providing the real signal as a digitally filtered signal.

According to the digital filtering of the present invention, runtime processing can be operated at a high rate of speed only with table reference so that the filter can meet the limit on the power spectral density with the effective number of bits for the DAC being fewer than in the conventional art.

DETAILED DESCRIPTION OF THE DRAWINGS

Although there are various definitions for symbols used in transmission according to modulation, symbols of information to be sent correspond to points on the I,Q plane called the constellation diagram. In the complex plane represented in a constellation diagram, the abscissa is a real axis (re) and the ordinate is an imaginary axis (im), and the amplitude and phase of a signal is shown round the point (0,0) on both of the I and Q axes where the distance from the point (0,0) represents the amplitude and the angle from the point (0,0) represents the phase. That is to say, the symbols at the same distance from the center have equal amplitude for their signal waveforms but have different angles so that they are different in phase. As such, the point of the symbol on the plane determines the phase value and the amplitude value.

Here, in the case of the modulation being pi/2-shift BPSK, the information to be sent defines four symbols at (1,0), (0,1), (−1, 0), (0,−1) on the I,Q plane. The transmitter sends a signal corresponding to each point on the I,Q plane according to the symbols to send. In an embodiment of the present invention, these four symbols are used as 'the reference symbols'.

The pulse shaping interpolation is performed to obtain a desired spectrum by controlling the trajectory of signal between the plurality of reference symbols.

Figure 3:
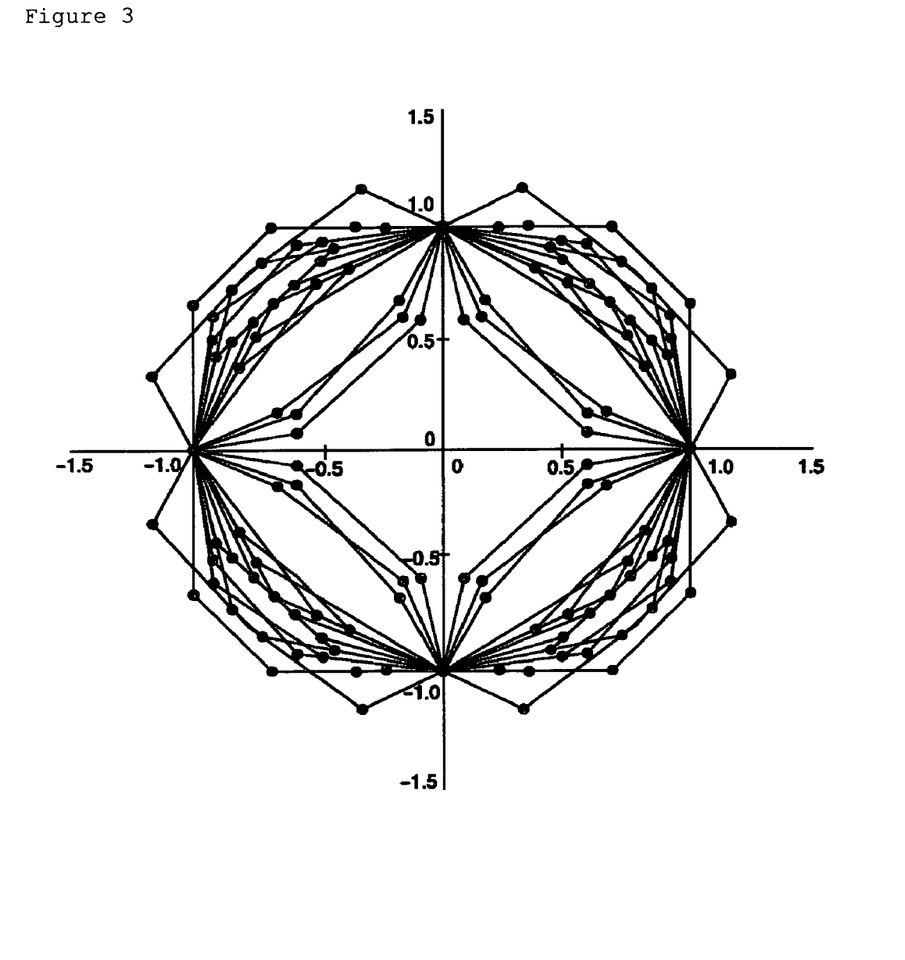
FIG. 3 is a diagram showing a pulse shaping trajectory when threefold interpolation, to meet the definition of the spectrum of a standard, is performed.

FIG. 3 is a diagram showing a pulse shaping trajectory when threefold interpolation is performed to meet the definition of the spectrum of a standard. The reference symbols originally to be sent as the information are (1,0), (−1,0), (0,1), (0,−1). When the reference symbols change to the next symbols from the respective points, two interpolation points are inserted as 'interpolate symbols'; as a result, the signal is output at the threefold frequency.

In this modulation, a diagonal transition, for example from (1,0) to (0,1) is not defined in the pi/2-shift BPSK. Since it is the BPSK for rotating each symbol by pi/2, which means by 90 degrees, the adjoining next reference symbol that can be moved from a certain reference symbol is actually at the point rotated from there by +90 degrees or −90 degrees.

As shown in FIG. 3, there are many transition trajectories between the symbols. This means that an interpolation point is not uniquely determined from the two reference symbols, but if the interpolation point is not actually determined by also using the trajectories of a plurality of symbols in the past, conditions of the frequency spectrum are not met. In the process of obtaining the optimal interpolation point, a calculation is performed from the finite records in the past and the optimal interpolation point according to the calculation is obtained. However, there is a difference between the frequency spectrum in the transmission performed by actually using the interpolation point and the frequency spectrum according to the calculation. When the positions of the interpolation points are discretely represented, a quantize error also occurs in the frequency spectrum. As the optimal frequency spectrum is difficult to find through a mathematical analysis method in this case, and instead, it is required to find the optimal frequency spectrum out by the heuristic approach, i.e., the heuristic learning approach, as prior learning. On the other hand, once the optimal interpolation point is found out by the heuristic approach, it is only needed to prepare a memory area and save the result in there so as to perform interpolation by using the results stored in the memory, and the optimal interpolation point needs not to be obtained again in the environment actually to be used.

An aspect of obtaining the interpolation point from a group of six reference symbols in the past will be described as an example. The technical concept of the present invention is not limited to being applied to six reference symbols, but can be applied to a pattern that continues over any predetermined number. As for interpolation, it is needless to say that a signal only needs to be sampled at regular intervals that are finer than those of the referential sampling at regular intervals, and the interpolation is not limited to the pulse shaping by the threefold interpolation.

Extraction of Characteristic Sequence Pattern

In the present invention, interpolation points are obtained from a group of symbols in the past for performing pulse shaping. It is characterized by classifying the six reference symbols in the past by the characteristic sequence patterns, and interpolation is performed by using the interpolation points of the sequence patterns, i.e., one or more interpolate symbols. The characteristic sequence patterns may be determined and given by examining the periodicity in the sequence patterns. It will be described with reference to the specific example shown in FIG. 4.

Figure 4:
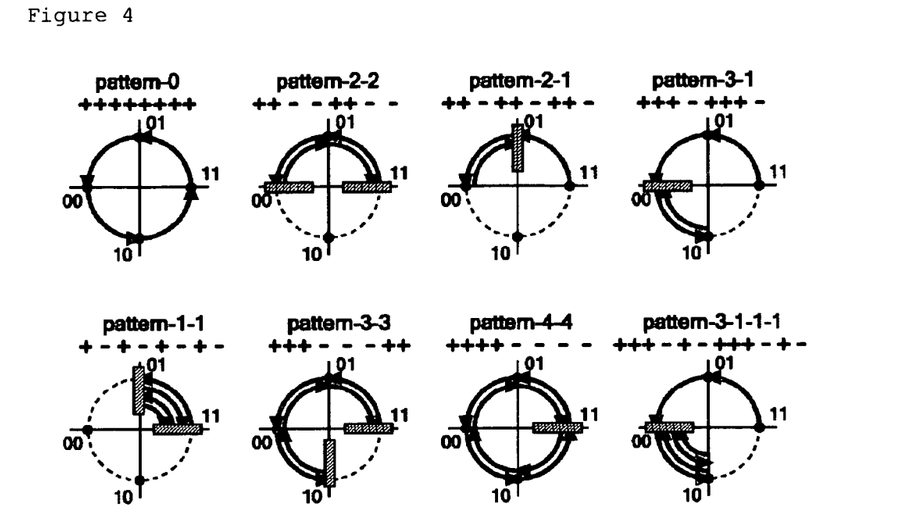
FIG. 4 is a diagram showing classified sequence patterns.

FIG. 4 is a diagram showing classified sequence patterns. The signs "+" and "−" shown in FIG. 4 represent positive and negative of the phase in transition from a certain reference symbol to the adjoining next reference symbol, where "+" represents +90 degrees and "−" represents −90 degrees. As an example, pattern-0 is the sequence pattern with the symbols transitioned always in the same direction, i.e., rotation to a certain direction. As another example, Pattern-2-2 is the transitions in the direction "+" twice and "−" twice as shown by the signs. These sequence patterns are characterized by their periodicity.

Until all the combinations of the input symbols expected for the real input signals are included, the sequence patterns like the above examples are added. All the combinations for obtaining the interpolate symbols from the six symbols in the past are the eight sequence patterns shown in FIG. 4.

Figure 5:
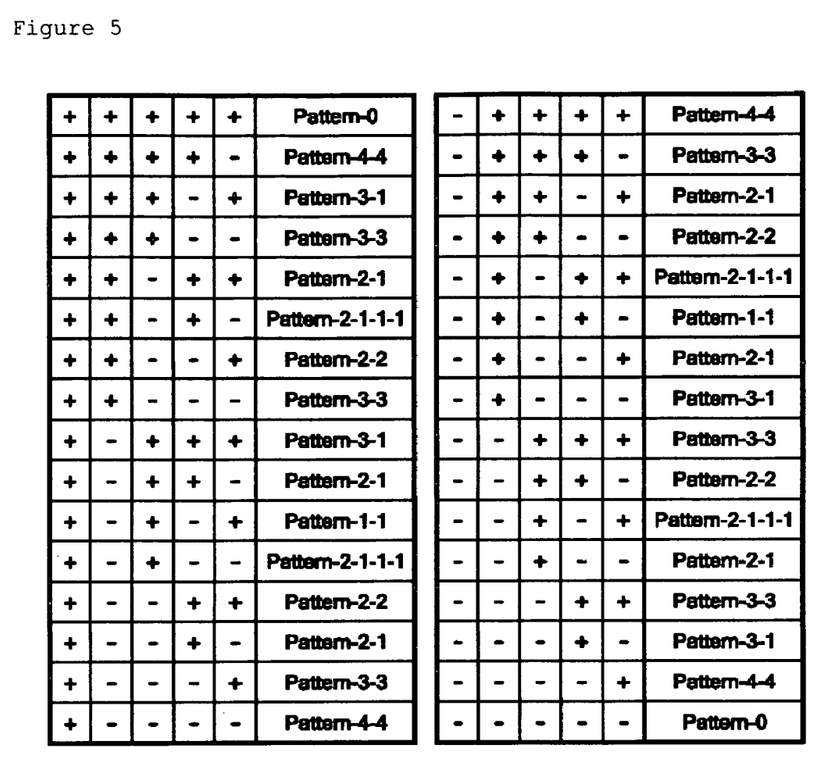
FIG. 5 is a diagram showing all the combinations that include all the combinations of expected input symbols for obtaining an interpolate symbol from six symbols in the past.

FIG. 5 is a diagram showing all the combinations that include all the combinations of expected input symbols for obtaining an interpolate symbol from six symbols in the past. It is needless to say that these eight sequence patterns (Pattern-0-) are not necessarily the optimal and the definitions of the sequence patterns are not limited to the combinations. Those skilled in the art will easily adopt the aspect similar to these examples.

Spectrum analysis is performed on each sequence pattern and an interpolation symbol that meets a desired spectrum (i.e., meets the conditions of radio standards) is calculated and found out. Here, interpolation symbols are two symbols, but a single symbol may be used. This may be performed by simulation of a prior learning.

Here, each of the selected sequence patterns is the periodic characteristic sequence pattern, and with the periodic characteristics, interpolation symbols are easily found out. It is usually quite difficult in computational complexity to find out the optimal interpolation symbols from a random trajectory, and when interpolation symbols are represented by n bits values on the I, Q axes, only combinations of two interpolation symbols between a certain symbols are (nth root of 2)×(nth root of 2), and when the conditions are applied to all the combinations of the six symbols in the past, the combinations will be $6^{th}$ root of ((nth root of 2)×(nth root of 2))=$12^{th}$ root of 2. If an 8-bit DAC is to be used, the combinations will be $96^{th}$ root of 2, which is unfeasible.

But only for the purpose of finding out the interpolation symbols for the periodic sequence pattern, the search space can be drastically reduced. This will be specifically described below with reference to the example of Pattern-0.

Figure 6:
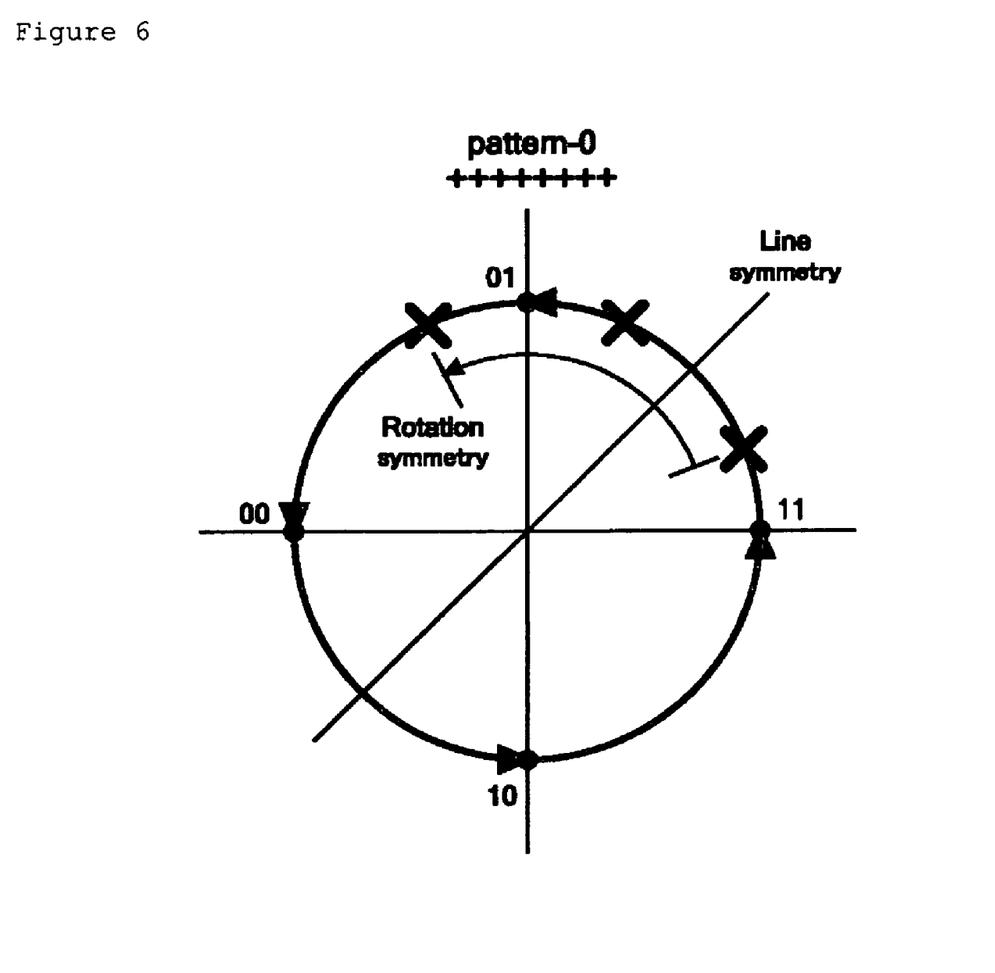
FIG. 6 is a schematic diagram showing symmetry of Pattern-0.

FIG. 6 is a schematic diagram showing the symmetry of Pattern-0. As this pattern-0 is a sequence pattern that rotates in the same direction, it is symmetrical with respect to the rotation by 90 degrees, and symmetrical with reference to the line of 45 degrees for two interpolation symbols between the reference symbols.

Therefore, in the search space for the interpolation symbols of the pattern-0, all the interpolation symbols are determined by setting only one interpolation symbol, the combinations are nth root of 2. If an 8-bit DAC is to be used, the combinations will be only $8^{th}$ root of 2, by which searching is much more feasible.

Similarly, the other sequence patterns are symmetric so that interpolation symbols for each sequence pattern are within a search space that can be calculated.

Figure 7:
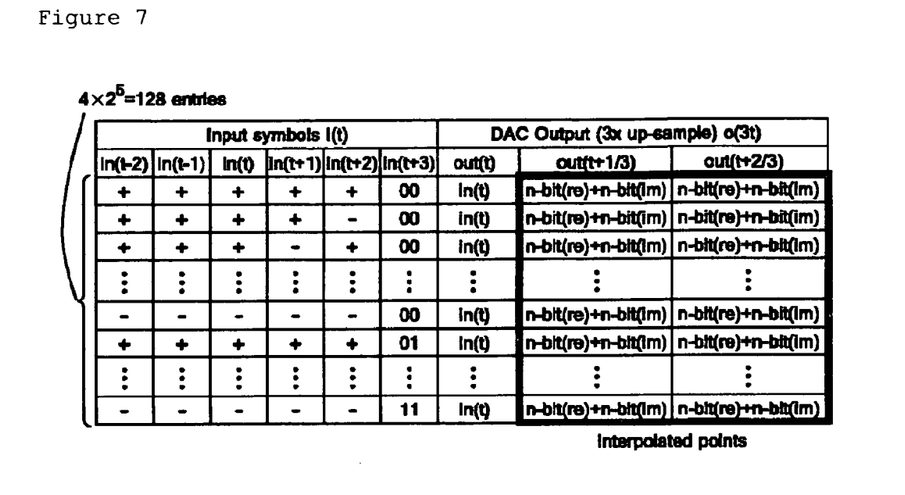
FIG. 7 is a diagram showing correspondence between the sequence patterns and the interpolate symbols.

When the interpolation symbols are obtained for each of the eight sequence patterns and the interpolation symbols corresponding to the sequence patterns that are the combinations of the six symbols in the past as shown in FIG. 5, they can be represented as shown in FIG. 7. In other words, the table representing correspondence between the movement of the six symbols in the past as input and the threefold interpolation symbols that are determined from the six symbols as output is completed. Specifically, only the found out sequence patterns and the phase value and amplitude value corresponding to the found out one or more interpolation symbols may be stored in the memory as a lookup table (LUT).

FIG. 7 is a diagram showing correspondence between the sequence patterns and the interpolate symbols. The correspondence table shown in FIG. 7 is used in the operation of the real transmission circuit. First, the real signal is received as input and converted into the sequence pattern, i.e., transmission symbols, based on the reference symbols. Actually, the interpolation symbols are determined against the transmission symbols that indicate random movements.

Figure 8:
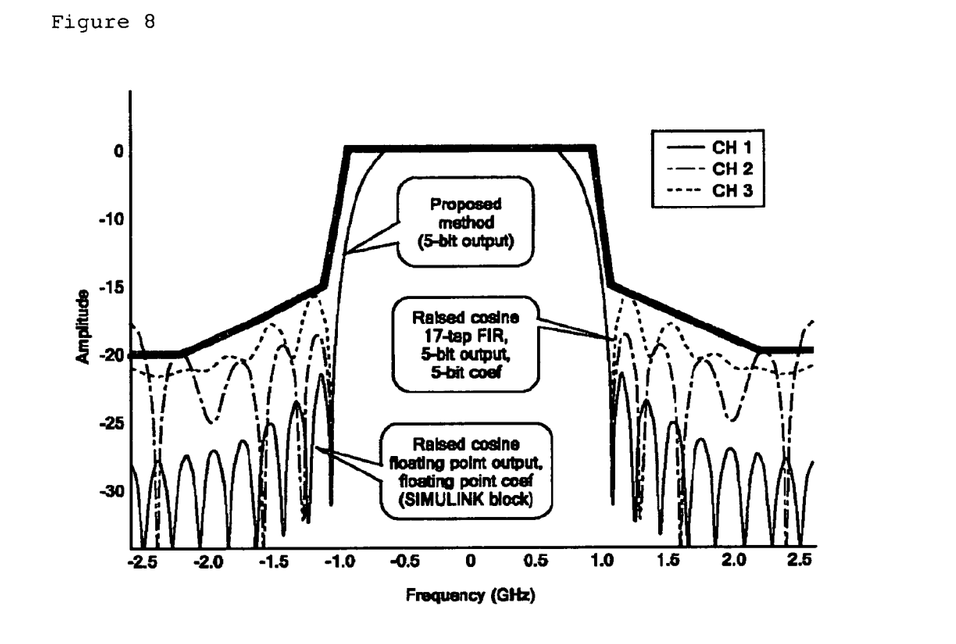
FIG. 8 is a diagram showing a spectrum obtained by applying the method of the present invention to a real random input signal.

FIG. 8 is a diagram showing a spectrum obtained by applying the method of the present invention to a real random input signal. In FIG. 8, the line that is drawn along the straight line is a spectrum obtained by the method. As shown in the figure according to the method of the present invention, the spectrum that is not made to meet the conditions by the conventional raised cosine FIR filter can be made to meet the conditions even under the control of 5-bit DAC.

In the method according to the present invention, at first, only interpolation symbols of some characteristic sequence patterns are calculated and stored. Then, for the interpolation symbols for the random input symbols in the actual operating environment, a lookup table is searched for the characteristic sequence pattern that corresponds to the input sequence pattern, and if the sequence pattern that matches the input sequence pattern is found by the looking up, the interpolation symbols for the characteristic sequence pattern only need to be obtained.

Figure 9:
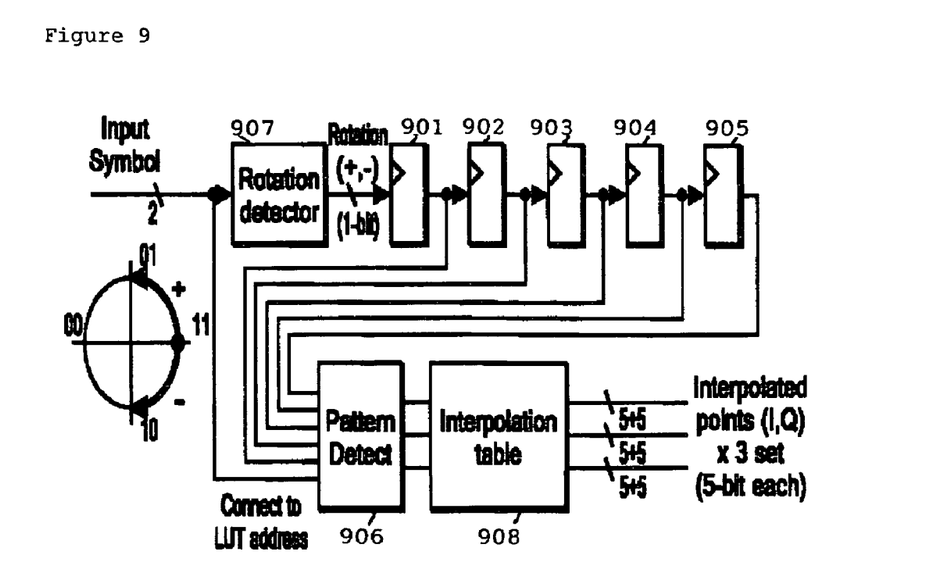
FIG. 9 is a diagram showing circuitry for implementing the method of the present invention.

FIG. 9 is a diagram showing circuitry with the method of the present invention applied. The latches, 901-905, drawn in the upper part of FIG. 9 are for obtaining the records of the input symbols in the past. The Pattern Detect block 906 is a circuit for detecting the characteristic sequence pattern the input symbols belong to from the information of the input symbols in the past. After the sequence pattern to which the input symbols belong to is detected at Rotation Detector 907, the Interpolation Table (Lookup Table) 908 obtains the interpolation symbols for the sequence pattern. Therefore, only the information on the interpolation symbols corresponding to the characteristic sequence patterns (i.e., the phase values and amplitude values corresponding to the interpolation symbols) needs to be recorded in the Interpolation Table.

Figure 10:
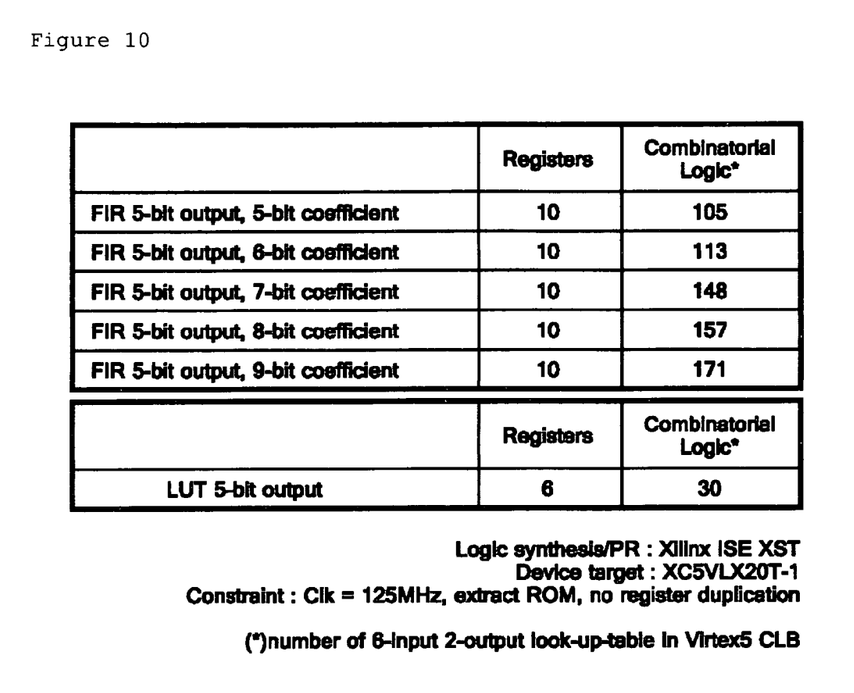
FIG. 10 is a diagram showing the result of the amount of circuit evaluation by actually implementing a logical circuit with the circuitry of the present invention.

FIG. 10 is a diagram showing the number of circuits used by actually implementing a logical circuit with the circuitry of the present invention. The upper part of FIG. 10 shows the number of circuits when the conventional raised cosine FIR filter is used, and the lower part shows the number of circuits required when implementing the present invention. It is apparent from the figures that the method enables the number of circuits to be decreased by one third to one sixth over the conventional filter.

The method for digitally filtering (pulse shaping) a signal can be wholly or partially provided by a computer program product including computer executable codes executing on one or more processing devices.

The invention claimed is:

1. A method for digitally filtering a signal comprising:
sampling a signal and representing the signal discretely by a plurality of reference symbols with different phases and amplitudes;
sampling more finely between said plurality of discretely represented reference symbols to prepare a plurality of interpolate symbols consisting of symbols with different phases and amplitudes as discrete representations;
giving a sequence pattern that represents positive and negative direction transitions that continue over a predetermined number from a certain reference symbol to an adjoining reference symbol;
finding one or more interpolate symbols that meet conditions of a predetermined frequency spectrum and a predetermined amplitude with reference to the given sequence pattern;
storing the found sequence pattern and a phase value and an amplitude value corresponding to the found one or more interpolate symbols as a lookup table in a memory;
receiving a real signal as an input and converting the signal into said sequence pattern with reference to the reference symbols;
looking up whether a sequence pattern that matches the sequence patterns stored in said memory is among the converted sequences; and
if a matched sequence pattern is detected by the looking up, reading out the phase value and the amplitude value corresponding to one or more interpolate symbols that constitute the sequence pattern from said memory, and providing the real signal as a digitally filtered signal.

2. The method according to claim 1, wherein said reference symbols are four symbols (the first power of 2× the first power of 2) that are represented by positive and negative on an I axis and by positive and negative on a Q axis on an I-Q plane in the constellation diagram, and positive and negative of the phase in transitions from a certain reference symbol to an adjoining reference symbol are represented as +90 degrees and −90 degrees.

3. The method according to claim 1, wherein if the sequence pattern has at least one of symmetry and periodicity, the sequence patterns to be searched are reduced based on the symmetry and periodicity.

4. A method for generating a lookup table for digitally filtering a signal, comprising:
   sampling a signal and representing the signal discretely by a plurality of reference symbols consisting of symbols having different phases and amplitudes;
   sampling more finely between said plurality of discretely represented reference symbols to prepare a plurality of interpolate symbols with different phases and amplitudes as discrete representations;
   giving a sequence pattern that represents directions of positive and negative of phase in transitions that continue over a predetermined number from a certain reference symbol to an adjoining reference symbol;
   finding one or more interpolate symbols that meet conditions of a predetermined frequency spectrum and a predetermined amplitude with reference to the given sequence pattern; and
   storing the found sequence pattern and a phase value and an amplitude value corresponding to the found one or more interpolate symbols as a lookup table in a memory.

5. A circuit for digitally filtering a signal, comprising:
   a plurality of latches for receiving a real signal as an input and converting the real signal into a sequence pattern that represents directions of positive and negative phase in transitions that continue over a predetermined number from a certain reference symbol to an adjoining reference symbol;
   a pattern detector connected to the plurality of latches for looking up whether the converted sequence pattern matches any stored sequence pattern stored in a memory;
   a lookup table connected to the pattern detector for storing a correspondence between the sequence patterns and one or more interpolate symbols; and
   a circuit connected to the lookup table for reading out a phase value and amplitude value corresponding to one or more interpolate symbols that constitute the sequence pattern from said lookup table when a matched sequence pattern is detected in the looking up by the pattern detector.

6. The circuit according to claim 5 wherein the plurality of latches are further adapted to sample the signal and representing the signal discretely by a plurality of reference symbols consisting of symbols having different phases and amplitudes and sample more finely between said plurality of discretely represented reference symbols to prepare a plurality of interpolate symbols with different phases and amplitudes as discrete representations.

7. A program storage medium for storing a computer executable program for, when executing at a processing device, performing a method for generating a lookup table for digitally filtering a signal, comprising:
   sampling a signal and representing the signal discretely by a plurality of reference symbols consisting of symbols having different phases and amplitudes;
   sampling more finely between said plurality of discretely represented reference symbols to prepare a plurality of interpolate symbols with different phases and amplitudes as discrete representations;
   giving a sequence pattern that represents directions of positive and negative of phase in transitions that continue over a predetermined number from a certain reference symbol to an adjoining reference symbol;
   finding one or more interpolate symbols that meet conditions of a predetermined frequency spectrum and a predetermined amplitude with reference to the given sequence pattern; and
   storing the found sequence pattern and a phase value and an amplitude value corresponding to the found one or more interpolate symbols as a lookup table in a memory.

8. The program storage medium of claim 7 wherein the method further comprises steps of:
   receiving a real signal as an input and converting the signal into said sequence pattern with reference to the reference symbols;
   looking up whether a sequence pattern that matches the sequence patterns stored in said memory is among the converted sequences; and
   if a matched sequence pattern is detected by the looking up, reading out the phase value and the amplitude value corresponding to one or more interpolate symbols that constitute the sequence pattern from said memory, and providing the real signal as a digitally filtered signal.

* * * * *